United States Patent [19]

Wreede et al.

[11] Patent Number: 4,687,720

[45] Date of Patent: Aug. 18, 1987

[54] SIDE LOBE SUPPRESSION IN HOLOGRAMS USING PRE-EXPOSURE

[75] Inventors: John E. Wreede, Monrovia; James A. Arns, Culver City, both of Calif.

[73] Assignee: Hughes Aircraft Company, Los Angeles, Calif.

[21] Appl. No.: 684,645

[22] Filed: Dec. 21, 1984

[51] Int. Cl.[4] .......................... G03C 1/66; G03C 5/02; G03H 1/06

[52] U.S. Cl. .......................................... 430/2; 430/1; 430/271; 430/273; 430/274; 430/289; 430/327; 430/394; 430/494

[58] Field of Search ...................... 430/1, 2, 394, 494, 430/274, 327, 289, 271, 273

[56] References Cited

U.S. PATENT DOCUMENTS

| | | | |
|---|---|---|---|
| 2,947,626 | 8/1960 | Famely et al. | 96/34 |
| 3,012,886 | 12/1961 | Lerner . | |
| 3,811,885 | 5/1974 | Marchant et al. | 430/394 |
| 3,940,204 | 2/1976 | Withrington . | |
| 3,963,490 | 6/1976 | Graube | 430/2 |
| 4,028,104 | 6/1977 | Graube | 430/1 |
| 4,509,817 | 4/1985 | Ho | 430/2 |

FOREIGN PATENT DOCUMENTS

| | | |
|---|---|---|
| 0043993 | 1/1982 | European Pat. Off. . |
| 2249364 | 5/1975 | France . |
| 58-19084 | 2/1983 | Japan . |
| 1371121 | 10/1974 | United Kingdom . |

OTHER PUBLICATIONS

Beesley et al., "The Use of Photoresist as a Holographic Recording Medium", Applied Optics, vol. 9, No. 12, Dec. 1970, pp. 2720-2724.

Applied Physics, vol. 10, No. 1, May 1976, S. Case et al.: "Index Modulation and Spatial Harmonic Generation in Dichromated Gelatin Films", pp. 41-51.

Proceedings of the SPIE, vol. 215, "Recent Advances in Holography", 1980, Published by SPIE (Palos Verdes, Calif., U.S.), S. McGrew: "Color Control in Dichromated Gelatin Reflection Holograms", pp. 24-31.

Optics and Laser Technology, vol. 5, No. 4, Aug. 1973; R. McPhedran: "Profile Formation in Holographic Diffraction Gratings", pp. 166-171.

Applied Optics, vol. 10, No. 3, Mar. 1971, K. Biedermann: "Attempts to Increase the Holographic Exposure Index of Photographic Materials", pp. 584-595.

Optics Communications, vol. 43, No. 2, Sep. 1982, R. Syms et al., "Noise Gratings in Photographic Emulsions", pp. 107-110.

IEEE Journal of Quantum Electronics, vol. QE-4, No. 11, Nov. 1968; A. Mikaelian et al.: "Holograms on Photochromic Films", pp. 757-762.

Applied Optics, vol. 18, No. 14, Jul. 15, 1979, B. Chang et al.: "Dichromated Gelatin for the Fabrication of Holographic Optical Elements", pp. 2407-2417.

Nouvelle Revue d'Optique, vol. 4, No. 5, Dec. 1973; J. J. Clair et al.: "Etude Experimentale des Proprietes Optiques des Photoresines; Etude et Analyse de Phenomenes Lies a la Preexposition", pp. 353-355.

*Primary Examiner*—Richard L. Schilling
*Attorney, Agent, or Firm*—Leonard A. Alkov; A. W. Karambelas

[57] ABSTRACT

A holographic recording medium is treated to eliminate side lobes. The method involves exposing opposed surfaces of the medium with filtered incoherent light either before or after a holographic exposure with coherent light. The incoherent exposure produces controlled desensitization of the medium, resulting in a sensitivity profile which increases continuously to a maximum near the center of the layer. A hologram recorded in the layer has a refractive index modulation which is high in the center of the layer and which decreases toward the surfaces of the layer.

13 Claims, 4 Drawing Figures

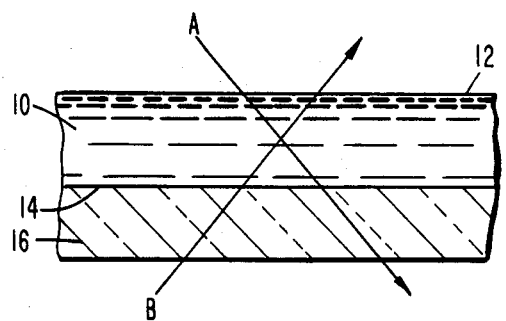
Fig. 1.
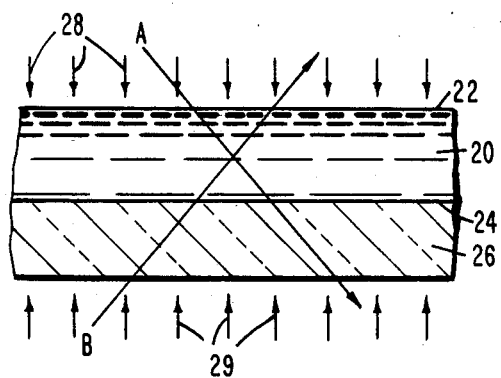
Fig. 2.
Fig. 4.
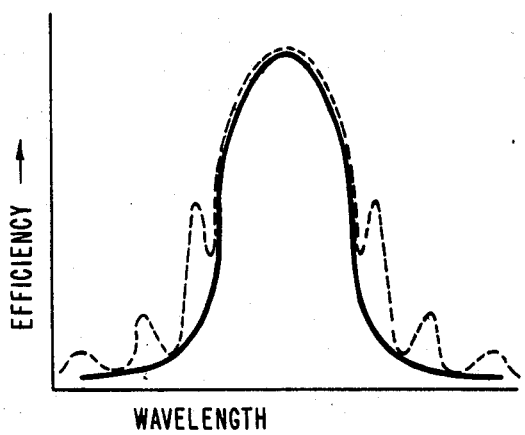
Fig. 3.
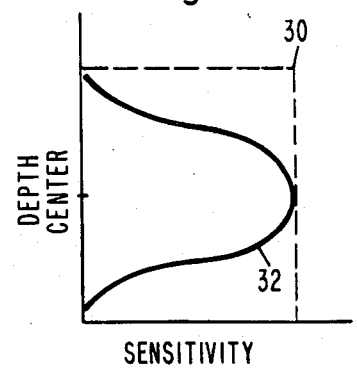

SIDE LOBE SUPPRESSION IN HOLOGRAMS USING PRE-EXPOSURE

BACKGROUND OF THE INVENTION

1. Field of the Invention

The invention relates generally to holography and more particularly has reference to improving holograms by suppressing unwanted side lobes.

2. Description of the Prior Art

A dichromated gelatin phase reflection hologram consists of a thin layer of photo-reactive gelatin on a glass substrate which has been exposed to in-phase laser beams of different directions. The beams intersect at the gelatin layer to set up an interference pattern which is recorded in the gelatin theoretically as a sinusoidal modulation in the index of refraction of the gelatin. A pattern of holographic fringes corresponding to the modulation of the index of refraction defines the hologram. Holograms have a number of uses.

In modern aircraft, both military and commercial, it is important that a substantial quantity of information be presented to the pilot while he is viewing the outside world. The holographic head-up display (HUD) has been developed for this purpose and provides relevant scale, alphanumerics, symbology, gun sight reticle (in fighter aircraft) and other information displays superimposed on the pilot's forward field of view. The information display is generated on a cathode ray tube and projected through a relay lens system to a transparent combiner screen is located between the pilot and the aircraft windscreen. The combiner, which includes a holographic film, reflects the projected images to the pilot's eyes while affording him an unobstructed view of the outside world through the combiner and windscreen.

Another use of holographic films has been in visors designed to protect eyes from damaging light exposure, such as might be encountered from an incoming laser beam. A holographic element incorporated into the visor diffracts and re-directs incoming laser light out of the field of vision. A cone of total reflection for a given wavelength can be provided to protect the user's eyes from incident damaging light beams.

A hologram acts as a wavelength selective filter. The uniform sinusoidal modulation of refractive index which is theoretically present in holograms produces an efficiency (bandpass) curve which has high side lobes. In practice, holograms using dichromated gelatin recording medium have even higher side lobes (asymmetric) than theory predicts because the gelatin processing creates non-sinusoidal fringe modulation. Side lobes are undesirable because they can produce ghost images and degrade photopic see-through.

In theory, side lobes can be reduced by varying the modulation of the refractive index as a function of depth throughout the recording medium. See Environmental Research Institute of Michigan Report AFOSR-TR-81-0196. However, no technique for carrying out that approach is currently known except that given in this application.

Theoretically, it would seem possible to vary the fringe modulation throughout the volume of the holographic recording medium by varying the concentration of photosensitive material in the medium or by making the holographic exposure at a wavelength which is highly aborptive. However, it has been found that neither approach has been achieved in practice. The adjustment which is possible by varying concentration is not sufficient. Variation in modulation by exposure can only occur if the exposure level is high enough to use up available reactive sites. Because the reactive sites in dichromated gelatin are dichromate ions, the exposure levels which can be used are limited to those effective with such ions. Moreover, tailoring the shape of the variation to tailor the side lobes requires selection of a wavelength capable of the proper absorbance level. For practical purposes, laser are only available in wavelengths determined by common usage and by existing laser equipment. Hence, there is not enough flexibility in wavelength selection to permit use of the proper wavelength in all cases.

Accordingly, a technique for achieving the desired variation in fringe modulation is needed.

A copending application Ser. No. 06/684,538 entitled "Flare Reduction in Holograms" by John E. Wreede and Mao-Jin J. Chern describes a technique for modifying the modulation of refractive index along surface regions of the holographic medium. However, that technique is concerned solely with elimination of surface diffraction effects inherent in slant fringe holograms. It does not address the problem of side lobes and it specifically teaches away from modifying the index modulation throughout the recording medium.

SUMMARY OF THE INVENTION

The present invention suppresses the high side lobes in a hologram efficiency curve by reducing the effective sensitivity of the holographic recording medium, for example a layer of dichromated gelatin, in a manner such that there is a continuous increase in sensitivity toward the center of the layer. A holographic fringe pattern with a normally uniform modulation recorded in such a layer will produce a hologram having a modulation in refractive index which is virtually zero at the surfaces and which increases toward the center of the medium.

Reduction in sensitivity of the recording medium is accomplished, in one embodiment, by exposing both sides of the layer to filtered incoherent light. The wavelength of the light is selected to produce a predetermined high level of absorbance in the gelatin layer up to the maximum which is obtainable with a specified gelatin thickness and a dichromate concentration of approximately 4.0 O.S. Exposure intensity is selected to insure exposure throughout the depth of the layer.

Another advantage of the present invention is that, by appropriate selection among exposure variables, the variation in sensitivity throughout the depth of the layer can be tailored to produce any desired hologram efficiency curve.

Objects of the invention are, therefore, to provide improved holograms and to provide holograms in which side lobes are suppressed.

A further object of the invention is to provide improved holographic HUD's and improved laser eye protection devices.

Still another object of the invention is to provide a method for making a hologram having an efficiency curve which is substantially free of side lobes comprising preparing a thin layer of holographic recording medium having opposed surfaces, exposing said surfaces of the layer to filtered incoherent light to produce a sensitivity profile therein which is substantially zero at said surfaces and increases substantially continuously to a maximum in the vicinity of the center of the layer, and exposing said layer to coherent light beams to record a hologram fringe pattern therein.

Another object of the invention is to provide a hologram comprising a thin layer of holographic recording medium having opposed surfaces, said medium having a light sensitivity profile which is substantially zero at the surface and increases substantially continuously to a maximum in the vicinity of the center of the layer.

Yet another object of the invention is to provide a method for making a holographic recording structure comprising preparing a thin layer of holographic recording medium having opposed surfaces, and exposing said surfaces to filtered incoherent light to produce a sensitivity profile therein which is substantially zero at said surfaces and increases substantially continously to a maximum in the vicinity of the center of the layer.

These and other and further objects and features of the invention are apparent in the disclosure which includes the above and below specification and claims and drawings.

BRIEF DESCRIPTION OF THE DRAWINGS

FIG. 1 is a schematic representation of a holographic recording medium and construction beams;

FIG. 2 is a schematic representation of a holographic recording medium and construction beams illustrating the present invention;

FIG. 3 is a diagram of the sensitivity profiles for the holographic media of FIGS. 1 and 2; and FIG. 4 is a diagram of the efficiency curves for the holograms of FIGS. 1 and 2.

DETAILED DESCRIPTION OF THE INVENTION

FIG. 1 illustrates a conventional method for making reflection holograms. A layer 10 of recording medium, such as dichromated gelatin, is applied to a glass substrate 16 and is exposed by two oppositely directed in-phase laser beams A and B. The beams penetrate the surfaces 12 and 14 of the gelatin layer 10 and are absorbed as they pass therethrough. For a gelatin layer 10 with 50% absorption, the relative strenths of the two beams, the beam ratio and the modulation of refraction index at different points in the layer 10 will be as follows:

At surface 12:
  A=100; B=50
  Beam ratio=2:1
  Modulation=0.707
At the center:
  A=70.7; B=70.7
  Beam ratio=1:1
  Modulation=0.707
At surface 14:
  A=50; B=100
  Beam ratio=1:2
  Motdulation=0.707

Modulation a function of the square root of the product of the beam intensities.

The sensitivity of the gelatin layer 10 is essentially constant throughout the layer, as shown by the sensitivity profile represented by the broken line 30 in FIG. 3. The hologram exhibits an efficiency curve which has high side lobes, as shown by the dotted line in FIG. 4.

FIG. 2 illustrates the present invention. A photosensitive layer 20, such as dischromated gelatin, having opposed surfaces 22 and 24 is applied to a substrate 26. The layer 20 is exposed on both sides with filtered incoherent light, represented by the arrows 28 and 29. The incoherent light has a wavelength selected to produce high absorbance within the gelatin layer 20 and an intensity level selected to insure exposure throughout the depth of the layer 20. Because the light is highly absorbed, less penetrates the deeper portions of the layer 20 and the layer 20 is thus variably exposed as a function of depth. The unexposed medium thus has a sensitivity which increases toward the center of the layer 20. Hence, a hologram recorded in the layer 20 with construction beams of low absorbance will have a refractive index modulation which is high in the center of the layer 20 and which decreases toward near zero at the surfaces 22 and 24 of the layer 20.

FIG. 2 shows the gelatin layer 20 exposed to conventional holographic construction beams A and B having a wavelength selected to produce low absorbance in the gelatin layer. The construction exposure may take place before or after the incoherent exposure. The relative beam intensities, the beam ratio, and the modulation of refractive index at various points in the layer 20 are as follows:

At surface 22:
  A=100; B=99
  Beam ratio=approximately 1:1
  Modulation of Refractive Index=0 (Progressively increasing to 1.0 at the center)
At the center:
  A=99.5; B=99.5
  Beam ratio=approximately 1:1
  Modulation of Refractive Index is approximately 1.0
At surface 24:
  A=99; B=100
  Beam ratio=approximately 1:1
  Modulation of Refractive Index=0 (Progressively increasing to 1.0 at the center)

The sensitivity profile of the gelatin layer 20 as a function of depth is represented by the solid line 32 in FIG. 3. The resulting hologram exhibits a variation in modulation of refractive index which corresponds to that solid line 32. The resulting hologram also exhibits an efficiency curve which is substantially free of side lobes, as shown by the solid line in FIG. 4.

The incoherent light exposure also causes the gelatin to harden in the areas where the light is absorbed. The hardened areas become responsive to different wavelengths after processing. As a result, the processed hologram will have a broader efficiency curve and higher overall efficiency than if the curve were broadened by the conventional technique of simply reducing the thickness of the gelatin layer.

Sample layers of dichromated gelatin were tested by pre-exposure with incoherent light from different types of sources for different exposure periods. One sample was pre-exposed with tungsten light through a National Burea of Standards standard 5-56 filter which peaks at about 440 nanometers for about 40 seconds with a light level reading of about 4.0 milliwatts per square centimeter (measured on a UDT power meter calibrated at about 514.5 nanometers). The sample developed an O.D. in excess of 4.1 in the primary beam (signifying an efficiency in excess of 99.992) with 27% efficient first side lobes. A similar sample with no pre-exposure was greater than 4.1 O.D. but had 56% efficient first side lobes. A sample subjected to an uncontrolled pre-exposure with a filtered mercury arc lamp (about 366 nanometers) gave 50% efficient primary beams with no evidence of side lobes. A conventional hologram for a diffraction optics headup display is 80% efficient with a first side lobe that is 30% efficient. The total light reflected in the side lobes is 25% of that reflected in the primary peak. Using the method of the present invention, the head-up display can be provided with a hologram having an 80% efficient primary beam and no side lobes.

As noted above in the description of FIG. 2, the holographic exposure is made with a wavelength which has very low absorbance in the gelatin 20. Even with negligible variation in beam ratio, the resultant modulation in refractive index can be quite high. Because more light from the construction beams can penetrate to the center of the layer 20 without overexposing the surfaces 22, 24, it is possible to obtain a higher index modulation in the center of the layer 20 than is possible with the method of FIG. 1.

The present invention is applicable to two-beam reflection holograms (as illustrated) or to reflection holograms where the second beam is provided by the return beam from a mirror.

It is theoretically possible to obtain identical results with post-exposure by incoherent light (i.e. incoherent exposure following hologram recording), but the results are less certain because the previously exposed portions of the gelatin will have more transmission than the unexposed portions.

It can now be readily appreciated that the present invention produces holograms which are substantially improved over those produced by prior techniques. The side lobes are eliminated or substantially reduced, enabling the manufacture of high quality combiners for head-up displays and visors for laser eye protection devices.

Although there has been described above specific methods for side lobe suppression in holograms for the purpose of illustrating a manner in which the present invention may be used to advantage, it will be appreciated that the invention is not limited thereto. Accordingly, any and all modifications, variations or equivalent arrangements which may occur to those skilled in the art are considered to be within the scope of the invention as defined in the following claims.

What is claimed is:

1. Method of making a hologram having an efficiency curve with substantially reduced side lobes comprising:
preparing a thin layer of holographic recording medium having opposed surfaces;
exposing said surfaces of the layer to filtered incoherent light in a manner to produce a sensitivity profile therein which is substantially zero at said surfaces and increases substantially continuously to a maximum in the vicinity of the center of the layer; and
exposing said layer having said sensitivity profile to coherent light beams to record a hologram fringe pattern therein.

2. The method of claim 1 wherein the layer is dichromated gelatin.

3. The method of claim 2 wherein the incoherent light is emitted from a tungsten lamp.

4. The method of claim 3 wherein the incoherent light is filtered through a National Bureau of Standards standard 5-56 filter which peaks at about 440 nanometers.

5. The method of claim 4 wherein the exposure to incoherent light has a duration of about 40 seconds and an intensity of about 4.0 milliwatts per square centimeter.

6. The method of claim 2 wherein the incoherent light is emitted from a mercury arc lamp and is filtered at about 366 nanometers.

7. The method of claim 1 wherein said incoherent light is incident upon both of said opposed surfaces at external faces thereof.

8. A hologram comprising a thin layer of holographic recording medium having opposed surfaces, said medium having a light sensitivity profile which increases substantially continuously to a maximum in the vicinity of the center of the layer.

9. The hologram of claim 8 further having a hologram fringe pattern recorded in said medium exhibiting a fringe modulation which increases substantially continuously to a maximum in the vicinity of the center of the layer.

10. The hologram of claim 8 wherein the light sensitivity profile is substantially zero at said surfaces.

11. The hologram of claim 9 wherein the fringe modulation is substantially zero at said surfaces.

12. Method for making a holographic recording structure comprising:
preparing a thin layer of holographic recording medium having opposed surfaces; and
exposing said surfaces to filtered incoherent light in a manner to produce a sensitivity profile therein which increases substantially continuously to a maximum in the vicinity of the center of the layer.

13. The method of claim 12 wherein the sensitivity profile is substantially zero at said surfaces.

* * * * *